(12) United States Patent
Yokoi et al.

(10) Patent No.: US 10,074,021 B2
(45) Date of Patent: Sep. 11, 2018

(54) OBJECT DETECTION APPARATUS, OBJECT DETECTION METHOD, AND PROGRAM

(71) Applicant: DENSO CORPORATION, Kariya, Aichi-pref. (JP)

(72) Inventors: Kensuke Yokoi, Kariya (JP); Kohta Ishikawa, Tokyo (JP); Ikuro Sato, Yokohama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/280,137

(22) Filed: Sep. 29, 2016

(65) Prior Publication Data

US 2017/0091565 A1 Mar. 30, 2017

(30) Foreign Application Priority Data

Sep. 30, 2015 (JP) .................................. 2015-195133

(51) Int. Cl.
| | |
|---|---|
| *B60R 11/00* | (2006.01) |
| *G06K 9/00* | (2006.01) |
| *G06K 9/32* | (2006.01) |
| *G06K 9/46* | (2006.01) |
| *G06K 9/62* | (2006.01) |
| *B60R 11/04* | (2006.01) |
| *B60W 30/095* | (2012.01) |
| *B60W 50/14* | (2012.01) |

(52) U.S. Cl.
CPC .......... *G06K 9/00805* (2013.01); *B60R 11/04* (2013.01); *B60W 30/095* (2013.01); *B60W 50/14* (2013.01); *G06K 9/00798* (2013.01); *G06K 9/3233* (2013.01); *G06K 9/4642* (2013.01); *G06K 9/6202* (2013.01)

(58) Field of Classification Search
CPC ........... G06K 9/00805; G06K 9/00798; G06K 9/4642; G06K 9/3233; G06K 9/6202; B60W 30/095; B60W 50/14
See application file for complete search history.

(56) References Cited

U.S. PATENT DOCUMENTS

| | | |
|---|---|---|
| 2006/0204039 A1 | 9/2006 | Maemura et al. |
| 2010/0027844 A1 | 2/2010 | Akita |
| 2012/0027258 A1 | 2/2012 | Uchida et al. |
| 2014/0037138 A1 | 2/2014 | Sato et al. |

(Continued)

*Primary Examiner* — Ping Hsieh

(74) *Attorney, Agent, or Firm* — Knobbe, Martens, Olson & Bear, LLP

(57) ABSTRACT

A vehicle detection apparatus detects an object based on an image captured from a vehicle. In the vehicle detection apparatus, a camera is mounted in the vehicle. A search region determining unit determines a region including a road surface in the image to be a search region. A cost minimizing unit divides the search region into two, an upper region and a lower region, by a boundary line, determines corresponding points in a plurality of images captured by the camera at different time points by applying an optical flow model having a fixed magnification factor to the upper region and an optical flow model having a planar constraint condition to the lower region, and determines a boundary line that minimizes cost related to a difference between pixel values of the corresponding points. A vehicle presence determining unit determines presence of a forward vehicle based on the boundary line.

17 Claims, 12 Drawing Sheets

(56) References Cited

U.S. PATENT DOCUMENTS

| | | | |
|---|---|---|---|
| 2015/0278633 A1* | 10/2015 | Yeh .......................... | G06K 9/52 |
| | | | 382/103 |
| 2016/0264134 A1* | 9/2016 | Ohsugi ............... | B60W 30/095 |
| 2017/0122762 A1* | 5/2017 | van der Molen ...... | G01C 21/32 |

* cited by examiner

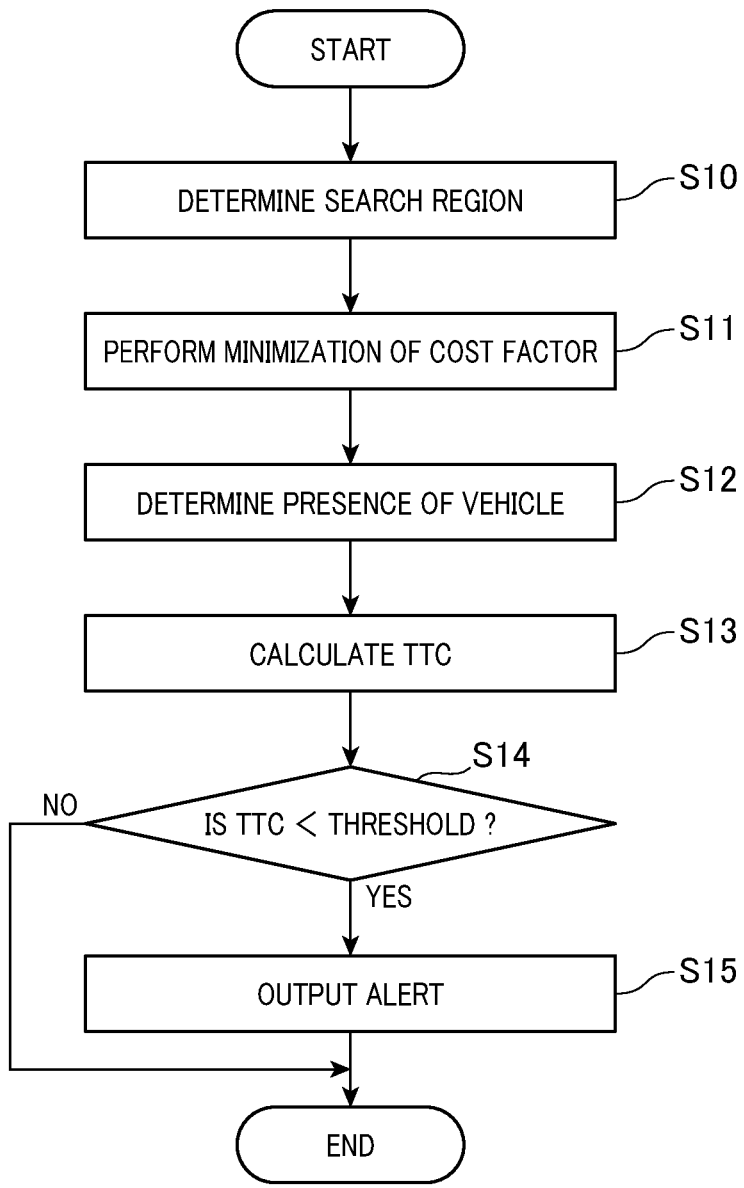

OBJECT DETECTION APPARATUS, OBJECT DETECTION METHOD, AND PROGRAM

CROSS-REFERENCE TO RELATED APPLICATION

This application is based on and claims the benefit of priority from Japanese Patent Application No. 2015-195133, filed Sep. 30, 2015. The entire disclosure of the above application is incorporated herein by reference.

BACKGROUND

Technical Field

The present disclosure relates to a technology for detecting an object based on an image captured by a camera. In particular, the present disclosure relates to a technology that is mounted to a vehicle and used thereby.

Related Art

A moving object recognition system is conventionally known. In the system, a moving object in the periphery of a vehicle is recognized. A driver is then issued an alert or automatic braking of the vehicle is performed (referred to, hereafter, as simply "notification"). A distance from an own vehicle to the moving object can be directly measured using a distance sensor, such as a millimeter wave radar. Alternatively, the distance can be measured by image processing being performed using a stereo camera. A moving direction of the moving object and a relative speed of the moving object in relation to the own vehicle can be determined through analysis of measured distances arranged in chronological order. As a result of the moving direction of the moving object and the relative speed thereof in relation to the own vehicle being determined, a likelihood (degree of risk) of the moving object colliding with the own vehicle can be determined. Notification can be given based on the degree of risk.

In addition, as a simple and low-cost moving object recognition system, a system is also known in which a moving object is recognized by a single-lens camera that only includes a single optical system and an image sensor. A typical method by which moving object recognition using a camera image is performed is a method in which image recognition is performed by the camera image being matched to a vehicle image (teacher data) stored in advance. As another method, a method focusing on movement of feature points (optical flow) in a plurality of images that are continuous in terms of time is also known (Japanese Patent Publication No. 4919036 and JP-A-2014-29604).

The method in which a vehicle is recognized through image recognition requires, in advance, a large volume of teacher data related to vehicles to be detected. In addition, even should a large volume of teacher data be prepared, a problem arises in that vehicles having unique shapes differing from those of ordinary vehicles cannot be detected. In addition, in the invention focusing on optical flow, described in Japanese Patent Publication No. 4919036 and JP-A-2014-29604, although objects moving in a lateral direction are easily detected, objects moving along a direction from the own vehicle towards a vanishing point of the camera image are sometimes may be difficult to detect, due to characteristics of the images captured by the camera.

SUMMARY

It is thus desired to provide an object detection apparatus that is capable of appropriately detecting an object, such as a forward vehicle.

A first exemplary embodiment of the present disclosure provides an object detection apparatus that detects an object of which a relative distance to a traveling vehicle changes, based on an image captured from the vehicle. The object detection apparatus includes: a camera that is mounted in the vehicle; a search region determining unit that determines an region including a road surface in the image to be a search region; a cost minimizing unit that divides the search region into two, an upper region and a lower region, by a boundary line, determines corresponding points in a plurality of images captured by the camera at different time points by applying an optical flow model having a fixed magnification factor to the upper region and an optical flow model having a planar constraint condition to the lower region, and determines a boundary line that minimizes cost related to a difference between pixel values of the corresponding points; and a determining unit that determines presence of an object based on the boundary line.

FIG. 1 is a diagram of an example of an image capturing a forward vehicle. Here, the vehicle is given as an example of an object that is present on a road. However, the object that is present ahead of an own vehicle is merely required to be an object that stands upright in a substantially vertical manner on a road surface. For example, people, animals, and road construction signs can also be detected as the object that is present ahead of the own vehicle.

Although a rear surface of the forward vehicle has recesses and protrusions to a slight degree, the recesses and protrusions are minimal compared to the distance from the own vehicle to the forward vehicle. Therefore, the rear surface can be approximated to be a plane that stands upright in a substantially vertical manner on the road surface. When the forward vehicle approaches or separates from the own vehicle, a vehicle region in which the forward vehicle appears in the image is enlarged or reduced at a fixed magnification ratio. Therefore, in the vehicle region, an optical flow model that describes a correspondence between image coordinates at two different time points is expressed by an enlargement/reduction model that is an optical flow model having a fixed magnification factor (hereinafter also referred to as a vehicle optical flow model).

Conversely, in a road surface region in which the road surface appears, the image is constrained by the road surface (plane). Consequently, a point in the road surface region moves from a vanishing point of the camera image towards the foreground so as to spread in an inverted V-shape. Therefore, in the road surface region, the optical flow model is expressed by a homography transformation model that is an optical flow model having a planar constraint condition (hereinafter also referred to as a road-surface optical flow model).

In this way, the optical flow models differ between the vehicle region and the road surface region. The present disclosure focuses on this difference in optical flow models. As a result of an upper region and a lower region that simultaneously optimize both optical flow models being found, a boundary between the vehicle region and the road surface region is found. A vehicle in the vehicle region is then detected. That is, the search region is divided into two, an upper region and a lower region, by a boundary line. The corresponding points in a plurality of images captured at different time points are determined by the optical flow model having a fixed magnification factor being applied to the upper region and the optical flow model having a planar constraint condition being applied to the lower region. The cost related to the difference between the pixel values of the corresponding points is then calculated.

As the boundary line becomes closer to a true boundary separating the vehicle region and the road surface region, that is, as the degree of coincidence between the upper region and the vehicle region increases and as the degree of coincidence between the lower region and the road surface region increases, the applicability between the upper region and the optical flow model having the fixed magnification factor becomes more favorable, and the applicability between the lower region and the optical flow model having the planar constraint condition becomes more favorable, and then, the cost related to the difference between the pixel values of the corresponding points decreases. Taking advantage of this principle, the boundary line separating the vehicle region and the road surface region can be determined, and presence of an object can be detected based on the boundary line.

In the object detection apparatus of the present disclosure, the search region may be a fixed region within the image. The cost minimizing unit may determine the boundary line that minimizes the cost, among boundary lines that are able to divide the search region into the upper region and the lower region.

As a result of the search region being fixed in this way, and the upper region and the lower region being changed by the boundary line being changed in the search region, a boundary line that separates the object and the road surface appearing in the fixed search region can be found.

In the object detection apparatus of the present disclosure, the search region may be a variable region that is enlarged or reduced with reference to a vanishing point in the image. The cost minimizing unit may determine the search region that minimizes the cost among the variable search regions and determines a boundary line thereof As a result of the search region being moved in this way, a boundary line that separates the object and the road surface appearing in the image can be found.

In the object detection apparatus of the present disclosure, the boundary line may be set such that regions of the upper region and the lower region are equal.

The inventors have found, through experiments, that whereas erroneous detection becomes a risk when the regions of the upper region and the lower region significantly differ, an appropriate result can be acquired when both regions are equal. As a result of the configuration of the present disclosure, accuracy of object detection can be improved.

The object detection apparatus of the present disclosure may include a white line detecting unit that detects a white line on a road from the image. The search region determining unit may determine the search region based on the white line detected by the white line detecting unit. In addition, the search region determining unit may determine a search region having a shape that matches the road surface.

In the present disclosure, the optical flow models are applied under a presumption that the road surface appears in the lower region and the object appears in the upper region. Therefore, objects other than the road surface are preferably not included in the lower region. In addition, objects other than the road surface and the object to be detected are preferably not included in the upper region. As a result of the configuration of the present disclosure, accuracy of object detection can be improved by the search region having an appropriate shape matching the shape of the road surface being determined based on the white line.

The object detection apparatus of the present disclosure may include a driving data receiving unit that receives data on speed or rotation angular velocity of the vehicle acquired from a sensor in the vehicle. The cost minimizing unit may perform cost minimization calculation using the data on speed or rotation angular velocity of the vehicle.

As a result of the data on speed or rotation angular velocity of the vehicle, acquired from a sensor in the vehicle, being used as a known variable, the cost minimization calculation can be simplified.

The object detection apparatus of the present disclosure may include a time-to-collision calculating unit that determines an amount of time until a detected object collides with the vehicle, based on a value determined by the cost minimizing unit. In addition, the object detection apparatus of the present disclosure may include a distance calculating unit that determines a distance to an object, with the boundary line determined by the cost minimizing unit set to a lower end portion of the object.

As a result of this configuration, for example, a driver can be notified of danger, based on the amount of time until the object collides with the vehicle or the distance to the object.

In the object detection apparatus of the present disclosure, the determining unit is configured to determine a change in cost when the upper region and the lower region that minimize cost, determined by the cost minimizing unit, are enlarged or reduced with reference to the vanishing point in the image, and determine that an object is not present when the change in cost is within a predetermined threshold.

As a result of this configuration, risk of an object being erroneously detected when an object is not present in a scene in which texture does not change in a radiating manner from the vanishing point can be reduced.

A second exemplary embodiment of the present disclosure provides an object detection method for detecting, by an object detection apparatus, an object of which a relative distance to a traveling vehicle changes based on an image captured from the vehicle. The method includes: a step of capturing an image of a region ahead of or behind the vehicle by a camera mounted in the vehicle; a step of determining, by the object detection apparatus, a region including a road surface in the image to be a search region; a step of dividing, by the object detection apparatus, the search region into two, an upper region and a lower region, by a boundary line, determining corresponding points in a plurality of images captured by the camera at different time points by applying an optical flow model having a fixed magnification factor to the upper region and an optical flow model having a planar constraint condition to the lower region, and determining a boundary line that minimizes cost related to a difference between pixel values of the corresponding points; and a step of determining, by the object detection apparatus, presence of an object based on the boundary line.

A second exemplary embodiment of the present disclosure provides a program for detecting an object of which a relative distance to a traveling vehicle changes based on an image captured from the vehicle. The program enables a computer to perform: a step of acquiring an image captured by a camera mounted in the vehicle; a step of determining a region including a road surface in the image to be a search region; a step of dividing the search region into two, an upper region and a lower region, by a boundary line, determining corresponding points in a plurality of images captured by the camera at different time points by applying an optical flow model having a fixed magnification factor to the upper region and an optical flow model having a planar constraint condition to the lower region, and determining a boundary line that minimizes cost related to a difference between pixel values of the corresponding points; and a step of determining presence of an object based on the boundary line.

In the present disclosure, a boundary between an object and a road surface can be appropriately determined based on a camera image, without use of teacher data stored in advance.

BRIEF DESCRIPTION OF THE DRAWINGS

In the accompanying drawings:

FIG. 5 is a diagram of a process executed by the object detection apparatus according to the first embodiment;

DESCRIPTION OF THE EMBODIMENTS

An object detection apparatus according to the embodiments of the present disclosure will hereinafter be described, with reference to the drawings. In the description below, a vehicle detection apparatus will be described as an example. The vehicle detection apparatus detects a forward vehicle as a detection target. However, the object that is the detection target to be detected by the object detection apparatus of the present disclosure is not limited to a forward vehicle. For example, the object detection apparatus can also detect objects such as pedestrians, animals, and road construction signs.

(First Embodiment)
[Configuration of the Vehicle Detection Apparatus]

Figure 2:
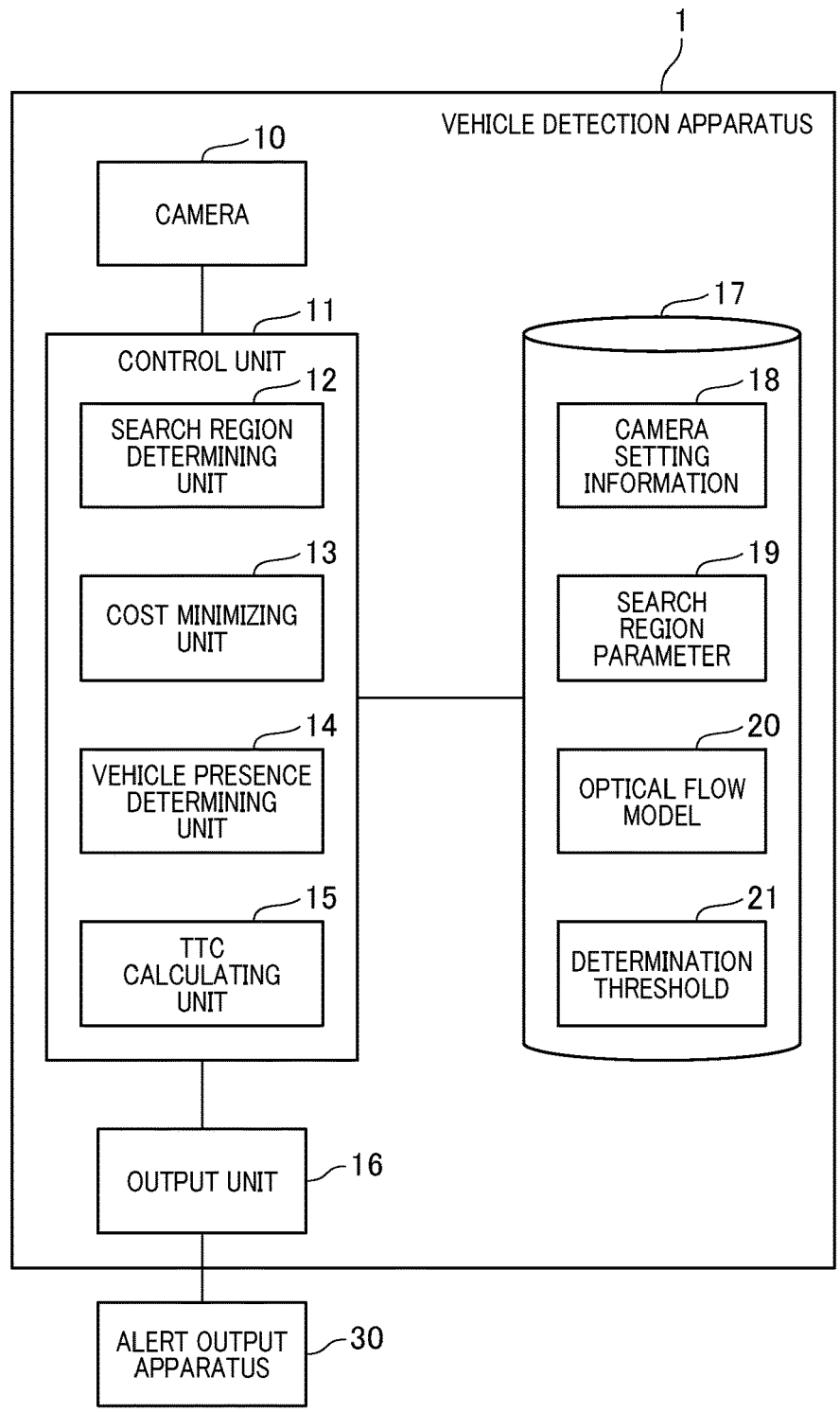
FIG. 2 is a diagram of a configuration of an object detection apparatus according to a first embodiment.

FIG. 2 is a diagram of a configuration of a vehicle detection apparatus 1 according to a first embodiment. The vehicle detection apparatus 1 includes a camera 10, a control unit 11, and an output unit 16. The control unit 11 performs a process for detecting presence of a vehicle based on an image captured by the camera 10. The output unit 16 outputs a detection result. The output unit 16 is connected to an alert output apparatus 30. The alert output apparatus 30 outputs an alert based on the determination result regarding the presence of a vehicle.

Figure 1:
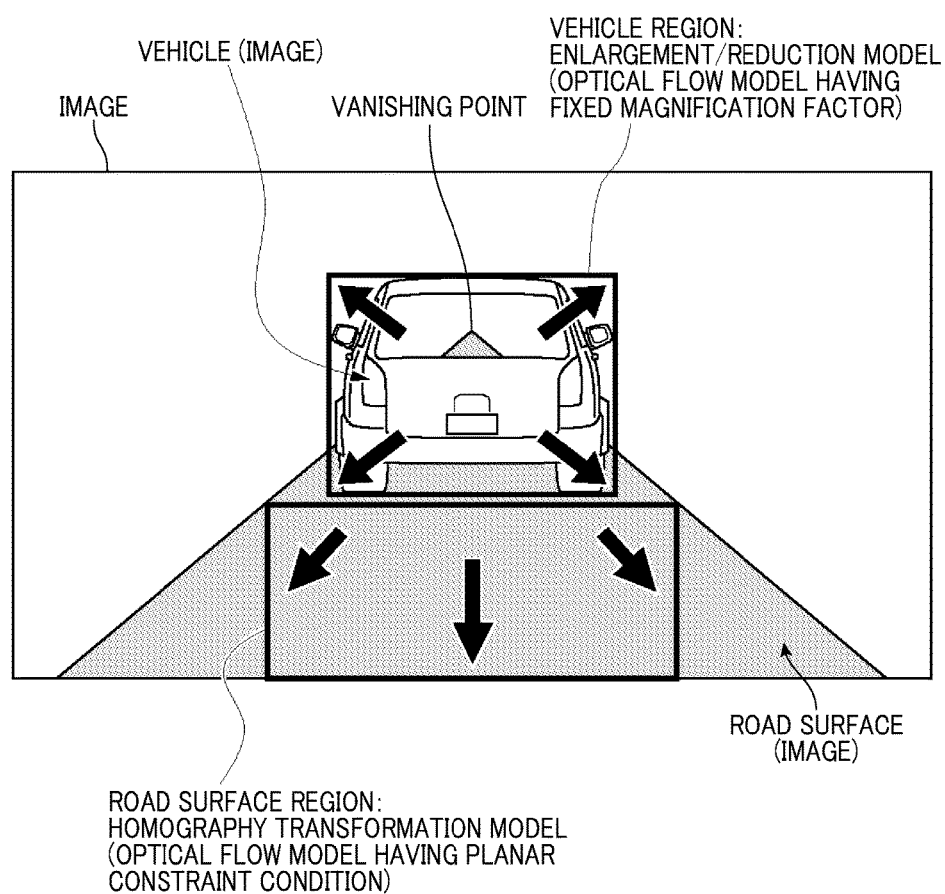
FIG. 1 is a diagram for explaining the principle of the present disclosure.

The camera 10 is set in a vehicle such as to capture an image in an advancing direction of an own vehicle. For example, the camera 10 may be set on a back side of a rearview mirror (towards the front of the vehicle) such as to capture an image of a region ahead of the vehicle. The camera 10 is a single-lens camera 10 that includes a single optical system and image sensor. The camera 10 continuously captures images at a predetermined interval (such as every 1/30 of a second) and outputs image signals. When a road surface is flat, the camera 10 is set such that an optical axis of the camera 10 and the road surface are parallel. When the optical axis of the camera 10 is a Z axis and a vertically downward direction is a Y axis, an X axis is defined by a right-handed coordinate system. An optical center of the camera 10 is preferably a point of origin of a vehicle coordinate system. However, in cases in which the optical center of the camera 10 and the point of origin of the vehicle coordinate system do not match, a difference therebetween is determined by calibration. The value determined by calibration, a height of the camera 10 from the road surface, and the like are stored in a storage unit 17 as setting information of the camera 10, i.e., camera setting information 18 as shown in FIG. 1.

The control unit 11 provides a function for detecting a forward vehicle based on a plurality of images captured by the camera 10. According to the present embodiment, an example in which the forward vehicle is detected based on two images captured at continuous time points will be described. However, the forward vehicle can also be detected using three or more images. A process by which the control unit 11 detects the forward vehicle will be described below.

Figure 3:
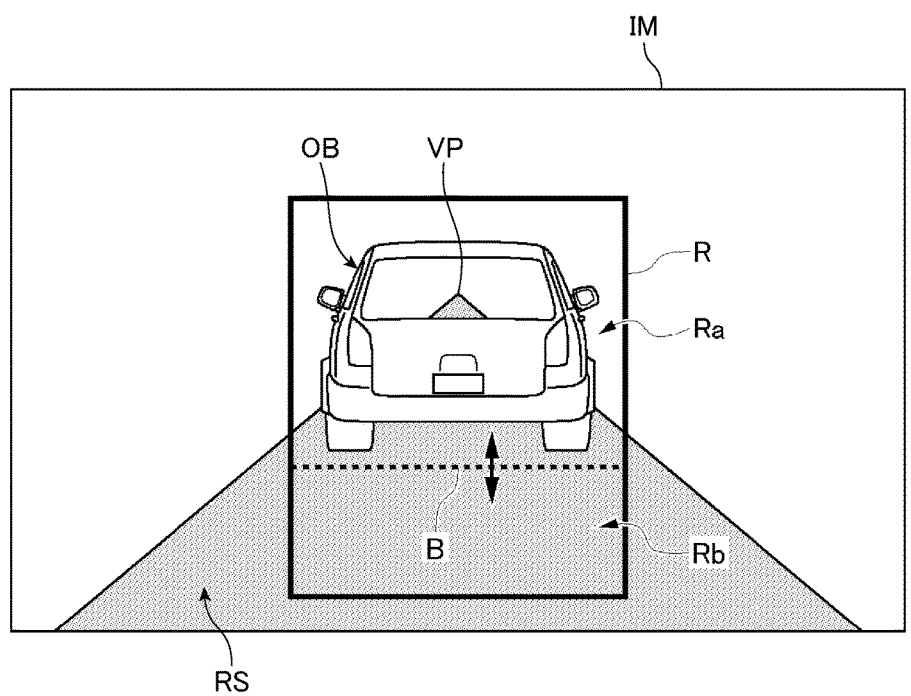
FIG. 3 is a diagram of an example of a search region according to the first embodiment.

FIG. 3 is a diagram of an example of a search region R determined by a search region determining unit 12. The search region R is a rectangular region including a region of the road surface RS that is mainly located on a lower side in an image IM. According to the present embodiment, the search region R is determined in a fixed manner in the image IM based on a region determination parameter 19 stored in the storage unit 17 as shown in FIG. 1. As the region determination parameters 9, for example, coordinate values of the apexes of the rectangular search region R are stored.

The search region R is divided into two sections, an upper region Ra and a lower region Rb, by a boundary line B that extends in a lateral direction. The position of the boundary line B is variable. Therefore, the upper region Ra and the lower region Ra are also variable. When a vehicle region in which a vehicle OB appears is present within the search region R, the object detection apparatus 1 determines the boundary line B that prescribes the upper region Ra such that a degree of coincidence with the vehicle region is the highest.

As described above, an optical flow model applied to the upper region Ra is a model having a fixed magnification factor. An optical flow model applied to the lower region Rb is a model having a planar constraint condition. The two optical flow models differ. Data of an optical flow model 20 including the two optical flow models is stored in the storage unit 17 as shown in FIG. 1. The optical flow models will be described hereafter.

A cost minimizing unit 13 provides a function for determining corresponding points in two images by applying the two optical flow models, described above, two images that are continuous in terms of time, and determining the upper region Ra and the lower region Rb such that cost related to a difference between pixel values of the corresponding points is minimized (that is, determines the boundary line B that prescribes such upper region Ra and lower region Rb).

Specifically, the cost minimizing unit 13 applies the optical flow model having the fixed magnification factor to the upper region Ra and the optical flow model having the planar constraint condition to the lower region Ra. The cost minimizing unit 13 thereby determines the respective corresponding points within the search regions R in the two images. A presumption can be made that the pixel values of the corresponding points do not change in the two images that are continuous in terms of time. Therefore, should the corresponding points be accurately determined, applicability of the two optical flow models becomes favorable. The cost related to the difference between the pixel values of the corresponding points can be minimized. To enable this presumption to be established, the imaging times of the two images are required to be sufficiently close to each other.

Figure 4A:
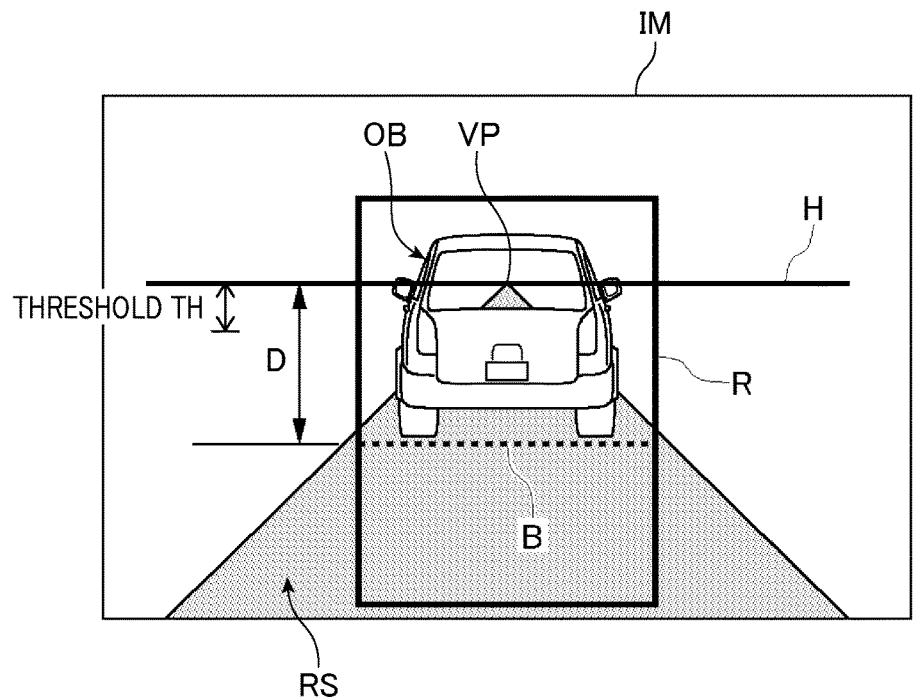
FIGS. 4A and 4B are diagrams for explaining a determination regarding presence of a vehicle according to the first embodiment.
Figure 4B:
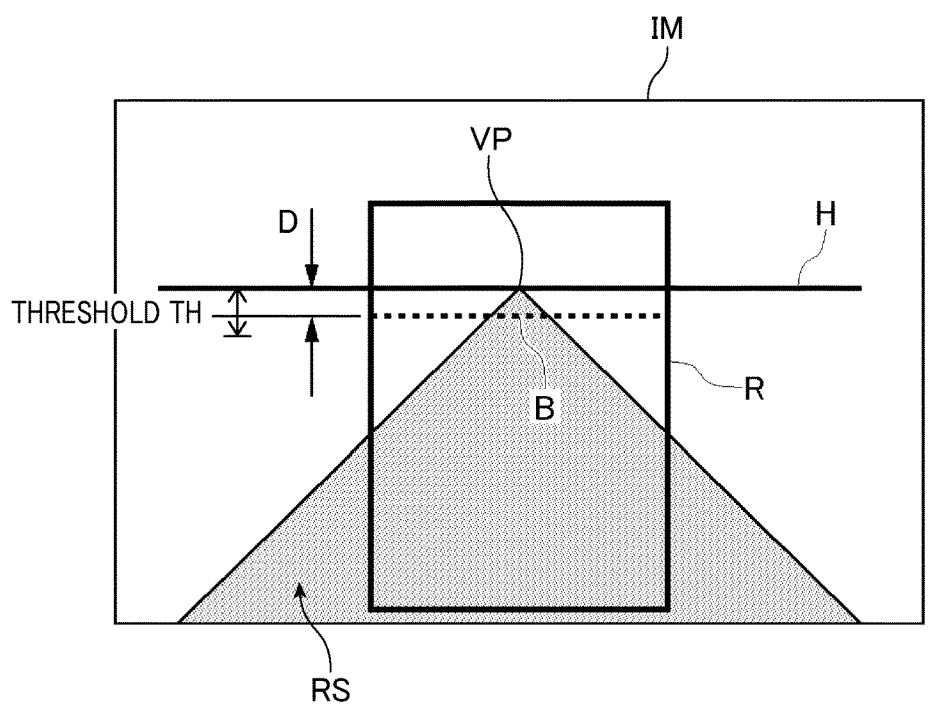

A vehicle presence determining unit 14 provides a function for determining the presence of a vehicle based on the boundary line B determined by the cost minimizing unit 13. FIGS. 4A and 4B are diagrams for describing the determination of the presence of a vehicle. The vehicle presence determining unit 14 determines whether or not a vehicle OB is present based on a distance D between a horizontal line H and the boundary line B. The horizontal line H extends in a lateral direction from a vanishing point VP in the camera image.

As shown in FIG. 4A, the vehicle presence determining unit 14 determines that a vehicle OB is present when the distance D between the horizontal line H and the boundary line B is a predetermined threshold TH or more. As shown in FIG. 4B, the vehicle presence determining unit 14 determines that a vehicle is not present when the distance D between the horizontal line H and the boundary line B is less than the predetermined threshold TH. A reason for this is that, when the boundary line B rises to the periphery of the horizontal line H, it is difficult to consider that a vehicle OB appears to be so large in size above the horizontal line H. Even should a vehicle OB be present, the vehicle OB is considerably far from the own vehicle. Therefore, the vehicle OB is hardly a problem in terms of traveling of the own vehicle. A determination threshold 21 for determining the presence of a vehicle OB is stored in the storage unit 17 as shown in FIG. 1. The vehicle presence determining unit 14 reads the determination threshold 21 from the storage unit 17 and uses the determination threshold 21 to determine whether or not a vehicle OB is present.

A TTC calculating unit 15 calculates a time-to-contact (TTC) based on a magnification factor of the vehicle region. The TTC indicates an amount of time until the forward vehicle collides with the own vehicle. A method for calculating the TTC will be described hereafter.

The process performed by the control unit 11 is described above. However, a program enabling a computer to perform the above-described process is also included within the scope of the present embodiment.

[Optical Flow Model]

Next, the optical flow models will be described. First, symbols used in the description below are defined in the following manner.

$I_t, I_{t+1}$

Input images at time t and t+1

$x_t, y_t$

Pixel coordinates at time t $x_{t+1}^C, y_{t+1}^C$

Pixel coordinates at time t+1, moved from $x_t, y_t$ based on vehicle optical flow model $x_{t+1}^R, y_{t+1}^R$ [Formula 1]

Pixel coordinates at time t+1, moved from $x_t, y_t$ based on road-surface optical flow model A cost function is defined in the following manner by applying a vehicle optical flow model (corresponding to an enlargement/reduction model that is an optical flow model having a fixed magnification factor) to the upper region Ra and a road-surface optical flow model (corresponding to a homography transformation model that is an optical flow model having a planar constraint condition) to the lower region Rb, and determining the difference between the pixel values of the corresponding points. The cost function is merely required to be an expression enabling cost related to the difference between the corresponding points of two images to be determined, and is not limited to the expression below.

[Formula 2]

$$J = \sum_{(x_t, y_t) \in C} \rho^C(I_{t+1}, I_t) + \sum_{(x_t, y_t) \in R} \rho^R(I_{t+1}, I_t) \quad (1)$$

where $$\rho^C(I_{t+1}, I_t) = \frac{1}{N^C} |I_{t+1}(x_{t+1}^C, y_{t+1}^C) - I_t(x_t, y_t)|^2$$

$N^C$: number of pixels in upper region $$\rho^R(I_{t+1}, I_t) = \frac{1}{N^R} |I_{t+1}(x_{t+1}^R, y_{t+1}^R) - I_t(x_t, y_t)|^2$$

$N^R$: number of pixels in lower region

Next, the above-described cost function is converted to a camera coordinate system. However, before the conversion, symbols used in the description below are defined in the following manner.

[Formula 3]

$x_t^{Ct}$ Three-dimensional position vector of point on object, viewed from camera coordinate system Ct at time t $x_{0t}^{Ct}$ Three-dimensional position vector of rotational center of object, viewed from camera coordinate system Ct at time t $u_t$ Speed of camera (own vehicle) at time t $v_t$ Speed of object at time t

[Formula 4]

$$\Omega_t = \begin{pmatrix} 1 & -\Omega_{tz} & \Omega_{ty} \\ \Omega_{tz} & 1 & -\Omega_{tx} \\ -\Omega_{ty} & \Omega_{tx} & 1 \end{pmatrix}$$

Angular velocity of camera (own vehicle) at time t $$\Gamma_t = \begin{pmatrix} 1 & -\Gamma_{tz} & \Gamma_{ty} \\ \Gamma_{tz} & 1 & -\Gamma_{tx} \\ -\Gamma_{ty} & \Gamma_{tx} & 1 \end{pmatrix}$$

Angular velocity of object at time t

An optical flow model that is generally applicable is calculated using the variables defined above. Upon performing the calculation, a constraint condition applicable to the vehicle region and a constraint condition applicable to the road surface region are applied, thereby determining the vehicle optical flow model and the road-surface optical flow model.

First, a relationship between (i) an object position viewed from an own-vehicle coordinate system at time t, expressed by $$x_t^{c_t}$$ [Formula 5]

and (ii) an object position viewed from the own-vehicle coordinate system at time t+1, expressed by $$x_{t+1}^{c_{t+1}}$$ [Formula 6]

are modelized.

An optical flow accompanying coordinate transformation due to motion of the own vehicle is expressed in the following manner.

$$x_t^{c_{t+1}} = \Omega_t^T(x_t^{c_t} - u_t)$$ [Formula 7]

An optical flow accompanying coordinate transformation due to motion of the object is expressed in the following manner.

$$x_{t+1}^{c_t} = \Gamma_t(x_t^{c_t} - x_{0t}^{c_t}) + x_{0t}^{c_t} + v_t$$ [Formula 8]

Based on the foregoing, the optical flow is expressed as follows, taking into consideration the motions of both the own vehicle and the object.

[Formula 9]

$$\begin{aligned} x_{t+1}^{c_{t+1}} &= \Omega_t^T(x_{t+1}^{c_t} - u_t) \\ &= \Omega_t^T \Gamma_t x_t^{c_t} + \Omega_t^T(I - \Gamma_t)x_{0t}^{c_t} + \Omega_t^T(v_t - u_t) \end{aligned}$$

In the above-described optical flow model, it is difficult to consider a rotational center coordinate of the object to be a variable. Therefore, an approximation $\Gamma_t = I$ is made, and the rotational center coordinate of the object is made not to appear, as in the following expression.

$$x_{t+1}^{c_{t+1}} = \Omega_t^T(x_t^{c_t} + v_t - u_t)$$ [Formula 10]

Next, the optical flow model is converted to movement of coordinates (x,y) in the camera images. Here, a simple projective transformation is used as an imaging model of the camera 10. However, a more advanced model can also be used taking into consideration lens distortion and the like.

[Formula 11]

$$x_{t+1} = k_x \frac{x_{t+1}^{c_{t+1}}}{z_{t+1}^{c_{t+1}}} = k_x \frac{x_t^{c_t} - \Omega_{tz}y_t^{c_t} + \Omega_{ty}z_t^{c_t} + \Delta_x}{z_t^{c_t} - \Omega_{ty}x_t^{c_t} + \Omega_{tx}z_t^{c_t} + \Delta_z}$$

$$y_{t+1} = k_y \frac{y_{t+1}^{c_{t+1}}}{z_{t+1}^{c_{t+1}}} = k_y \frac{y_t^{c_t} + \Omega_{tz}x_t^{c_t} - \Omega_{tx}z_t^{c_t} + \Delta_y}{z_t^{c_t} - \Omega_{ty}x_t^{c_t} + \Omega_{tx}y_t^{c_t} + \Delta_z}$$

Here, $\Delta_x$, $\Delta_y$, and $\Delta_z$, are x, y, and z components of $v_t - u_t$ Next, the constraint condition is considered. When the object is a vehicle, it can be considered that only a change in depth that is sufficiently small in relation to inter-vehicle distance occurs regarding a rear surface of the object. Therefore, an assumption is made that $$z_t^{c_t}$$ [Formula 12]

is fixed. In addition, it is appropriate to consider rotation $\Omega$ to also be small. When this constraint condition is applied, the expression of the above-described optical flow model can be changed in the following manner. However, second-order and subsequent terms are ignored through Taylor expansion.

[Formula 13]

$$x_{t+1}^C = (1-e)x_t - \Omega_{tz}\frac{k_x}{k_y}y_t + \frac{1}{k_x}\Omega_{ty}x_t^2 - \frac{1}{k_y}\Omega_{tx}x_t y_t + k_x\Omega_{ty} + k_x e d_x$$

$$y_{t+1}^C = (1-e)y_t + \Omega_{tz}\frac{k_y}{k_x}x_t - \frac{1}{k_y}\Omega_{tx}y_t^2 + \frac{1}{k_x}\Omega_{ty}x_t y_t - k_y\Omega_{tx} + k_y e d_y$$

Here, $e = \frac{\Delta_z}{z_t^{c_t}}$ $$d_x = \frac{\Delta_x}{\Delta_z}$$

$$d_y = \frac{\Delta_y}{\Delta_z}$$

When the image is of a road surface, the road surface neither rotates nor moves laterally. In addition, when a flat road surface is assumed, installation height of the camera 10 is fixed, and the constraint condition is expressed in the following manner.

$$\Gamma_t = I, \, v_t = 0, \, y_t^{c_t} = h$$ [Formula 14]

In addition, a term dependent on position expressed by $$1/z_t^{c_t}$$ [Formula 15]

is deleted by a constraint condition expressed by

[Formula 16]

$$y_t = k_y \frac{h}{z_t^{c_t}}$$

that is also added.

As a result, the expression of the optical flow described above can be changed in the following manner.

[Formula 17]

$$x_{t+1}^R = \frac{k_y h x_t - h_x \Omega_{tz} h y_t + k_x k_y h \Omega_{ty} - k_x(u_x - \Omega_{tz}u_y + \Omega_{ty}u_z)y_t}{k_y h - k_y/k_x \Omega_{ty} h x_t - (u_z - \Omega_{tx}h - \Omega_{ty}u_x + \Omega_{tx}u_y)y_t}$$

$$y_{t+1}^R = \frac{k_y h y_t}{k_y h - k_y/k_x \Omega_{ty} h x_t - (u_z - \Omega_{tx}h - \Omega_{ty}u_x + \Omega_{tx}u_y)y_t}$$

The cost function J is generated by applying the optical flow model having the constraint condition of the vehicle region to the expression $\rho^C$ of the upper region Ra of the cost function J in expression (1) and applying the optical flow model having the constraint condition of the road surface region to the expression $\rho^R$ of the lower region Rb of the cost function J. With the variables included in the cost function J, expressed by $$\{e, \Omega_{tx}, \Omega_{ty}, \Omega_{tz}, d_x, d_y, u_x, u_y, u_z\}$$ [Formula 18]

and the position of the boundary line B prescribing the upper region Ra and the lower region Rb set as variables, variables that minimize the cost function are determined by a following expression (2).

arg min J $\{e, \Omega_{tx}, \Omega_{ty}, \Omega_{tz}, d_x, d_y, u_x, u_y, u_z,$ boundary line position$\}$ [Formula 19]

As a result, the value of each variable, including the position of the boundary line B that minimizes the cost function J, is determined.

Here, a value 1−e that is obtained by the variable e, included in the optical flow model of the vehicle region, being subtracted from 1 indicates the magnification factor of the image of the vehicle region. Through use of the variable e determined by cost minimization, the TTC (time-to-contact) can be determined by $-1/e$.

FIG. 5 is a diagram of an operation by the vehicle detection apparatus 1 according to the first embodiment. The vehicle detection apparatus 1 continuously captures images of the region ahead of the vehicle by the camera 10, and acquires the captured images. The vehicle detection apparatus 1 determines a search region over which a search of a forward vehicle is performed in the acquired images (step S10). An example of the search region R is as shown in FIG. 3.

Next, the vehicle detection apparatus 1 reads data of an optical flow model 20 from the storage unit 17 and generates the cost function. The storage unit 17 stores therein data of an optical flow model having a fixed magnification factor (vehicle optical flow model) and data of an optical flow model having a road-surface constraint condition (road-surface optical flow model), as the data of the optical flow model 20. The cost minimizing unit 13 generates the cost function by applying the data of the optical flow model 20 that has been read out to the upper region Ra and the lower region Rb of the search region R. The cost minimizing unit 13 determines a combination of variables that minimizes the cost function (step S11).

The vehicle detection apparatus 1 determines whether or not a vehicle is present in the images based on the data on the position of the boundary line B that is one of the variables determined by the cost minimizing unit 13 (step S12). The determination regarding the presence of a vehicle is made based on whether or not the distance between the horizon line H and the boundary line B is less than the predetermined threshold, as described above.

Next, the vehicle detection apparatus 1 calculates the TTC using the variables that minimize the cost (step S13). Specifically, the TTC is determined by TTC=$-1/e$, using the value of the variable e when the cost is minimized. The vehicle detection apparatus 1 transmits the value of the TTC to the alert output apparatus 30.

The alert output apparatus 30 determines whether or not the TTC is lower than a predetermined threshold (step S14). When determined that the TTC is lower than the predetermined threshold (YES at step S14), the alert output apparatus 30 outputs an alert to a driver (step S15). As a result, for example, when the own vehicle is rapidly approaching the forward vehicle, the driver can be prompted to pay attention and a collision can be prevented. In addition, conversely, when separation from the forward vehicle is detected while the own vehicle is stopped at a traffic light or the like (when the value of the TTC becomes negative), the alert output apparatus 30 can output an alert to prompt the driver to follow the forward vehicle.

According to the present embodiment, the cost is calculated by applying the optical flow models suitable for the respective characteristics of the vehicle region and the road surface region to the upper region Ra and the lower region Rb of the search region R. As a result, when a vehicle appears in the search region R, the boundary line B that separates the vehicle region and the lower region Rb can be determined. The presence of a vehicle can be determined based on the position of the boundary line B. As a result, even when teacher data is not provided in advance, the forward vehicle can be detected from the image.

(Second Embodiment)

Next, a vehicle detection apparatus according a second embodiment of the present disclosure will be described. A basic configuration of the vehicle detection apparatus according to the second embodiment is identical to that of the vehicle detection apparatus 1 according to the first embodiment (see FIG. 2). The cost between images captured at different time points is calculated by differing optical flow models being applied to the upper region Ra and the lower region Rb of the search region R. The vehicle detection apparatus according to the second embodiment differs from that according to the first embodiment in terms of the manner in which the search region R is determined.

Figure 6:
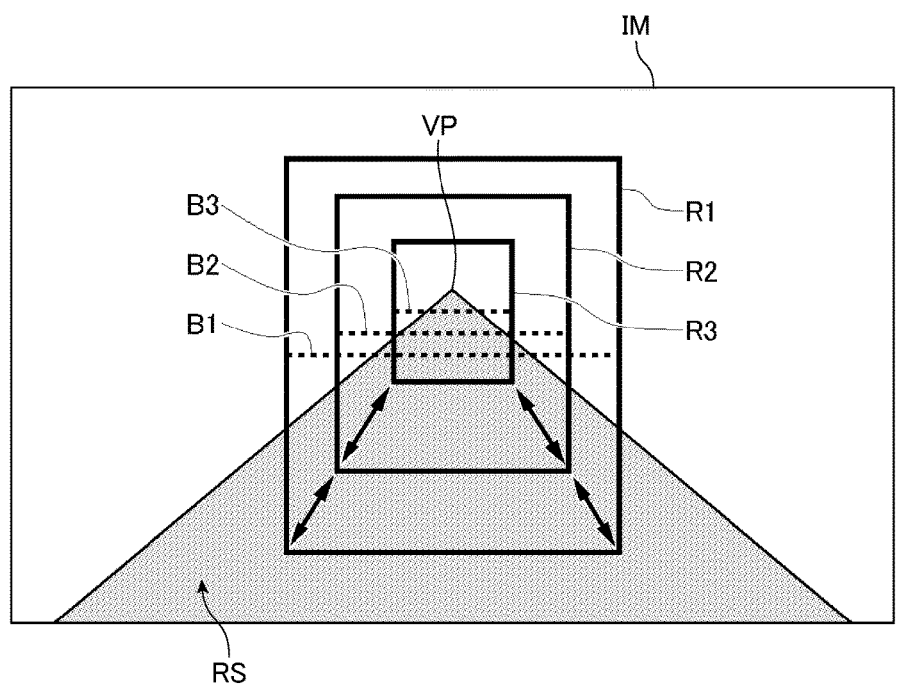
FIG. 6 is a diagram of an example of a search region according to a second embodiment.

FIG. 6 is a diagram for describing a search region determined by the vehicle detection apparatus according to the second embodiment. According to the second embodiment, as the region determination parameter 19 for the search region, information prescribing a plane (hereinafter referred to as a vertical plane) that is vertical to the road surface RS in actual space is provided. For example, a search region is prescribed to be four meters high and three meters wide. The search region in the image IM is prescribed by changing how far ahead the vertical plane is from the own vehicle. As shown in FIG. 6, a search region R1 in the image IM becomes larger as the vertical plane becomes closer to the own vehicle. The search regions R2 and R3 in the image IM becomes gradually smaller while maintaining the same aspect ratio with reference to the vanishing point VP in the camera image, as the vertical plane becomes farther from the own vehicle.

According to the second embodiment, boundary lines B1 to B3 that respectively divide the search regions R1 to R3 into two are each in a position that bisects the vertical plane into upper and lower sections in the actual space. As the vertical plane becomes farther from the own vehicle, the boundary lines B1 to B3 become gradually closer to the horizontal line. The vehicle detection apparatus according to the second embodiment determines the boundary line that minimizes the cost by applying the optical flow model having the fixed magnification factor to the upper region Ra and the optical flow model having the road-surface constraint condition to the lower region Rb in such search regions R1 to R3.

Figure 7A:
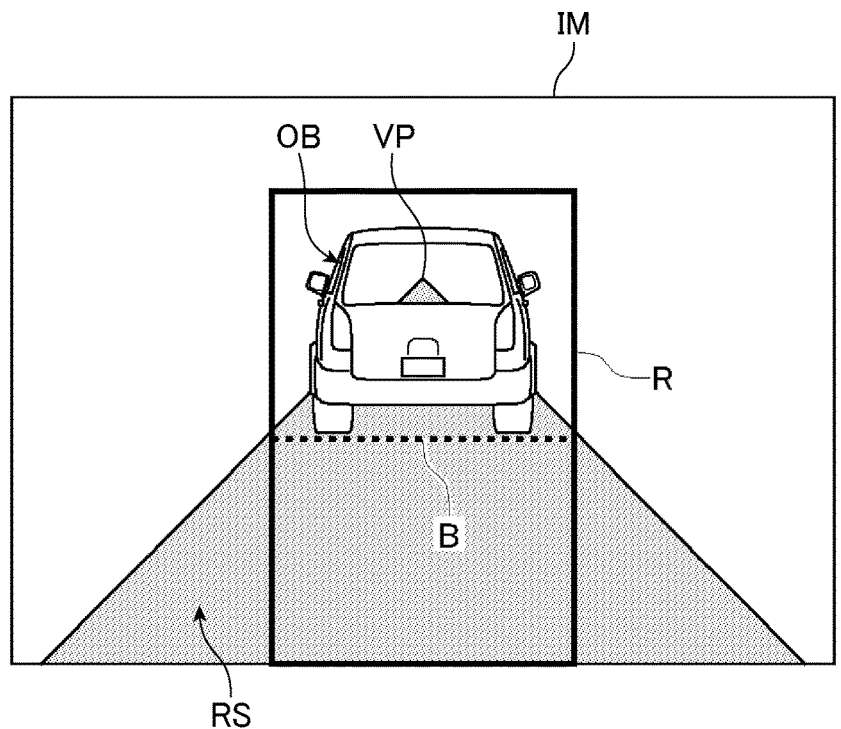
FIGS. 7A and 7B are diagrams for explaining a determination regarding presence of a vehicle according to the second embodiment.
Figure 7B:
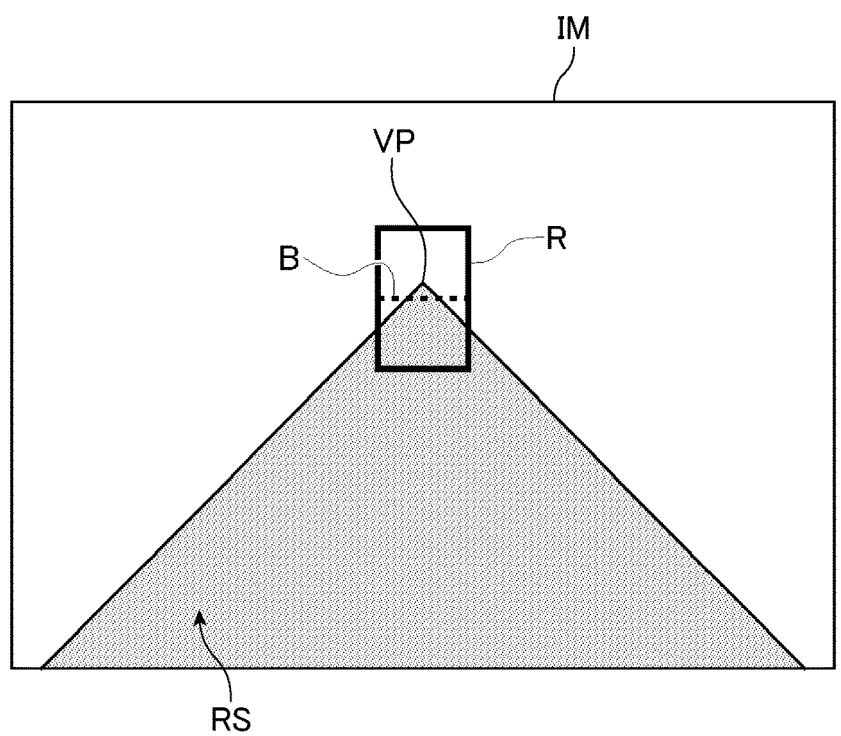

Next, a method for determining the presence of a vehicle by the vehicle detection apparatus according to the second embodiment will be described. FIGS. 7A and 7B are diagrams for describing the determination regarding the presence of a vehicle according to the second embodiment. According to the second embodiment, whether or not a vehicle is present is determined based on a distance to the vertical plane corresponding to the search region R that minimizes the cost. As shown in FIG. 7A, the vehicle detection apparatus determines that a vehicle OB is present when the distance to the vertical plane is a predetermined threshold or less. As shown in FIG. 7B, the vehicle detection apparatus determines that a vehicle OB is not present when the distance to the vertical plane is greater than the predetermined threshold.

In a manner similar to the vehicle detection apparatus 1 according to the first embodiment, the vehicle detection apparatus according to the second embodiment is capable of detecting a forward vehicle from an image without teacher data being provided in advance. In addition, according to the second embodiment, the search region R is equally divided into the upper region Ra and the lower region Rb by the boundary line B. Therefore, based on experiments conducted by the inventors, the accuracy of object detection can be improved.

(Third Embodiment)

Next, a vehicle detection apparatus according to a third embodiment will be described. A basic configuration of the vehicle detection apparatus according to the third embodiment is identical to that of the vehicle detection apparatus 1 according to the first embodiment (see FIG. 2). However, a function for preventing erroneous determination regarding the presence of a vehicle even when a special background is present is added. The special background referred to herein is a scene in which a vehicle is not actually present ahead and texture does not in a radiating manner from a vanishing point of the road in the image. For example, the special background may be a scene such as a straight road in a desert. In such scenes, even when a vehicle is not present in the upper region Ra, an optical flow model having a fixed magnification factor similar to that when a vehicle is present is established. Therefore, the cost is calculated to be small. As a result, a vehicle may be erroneously detected.

Figure 8:
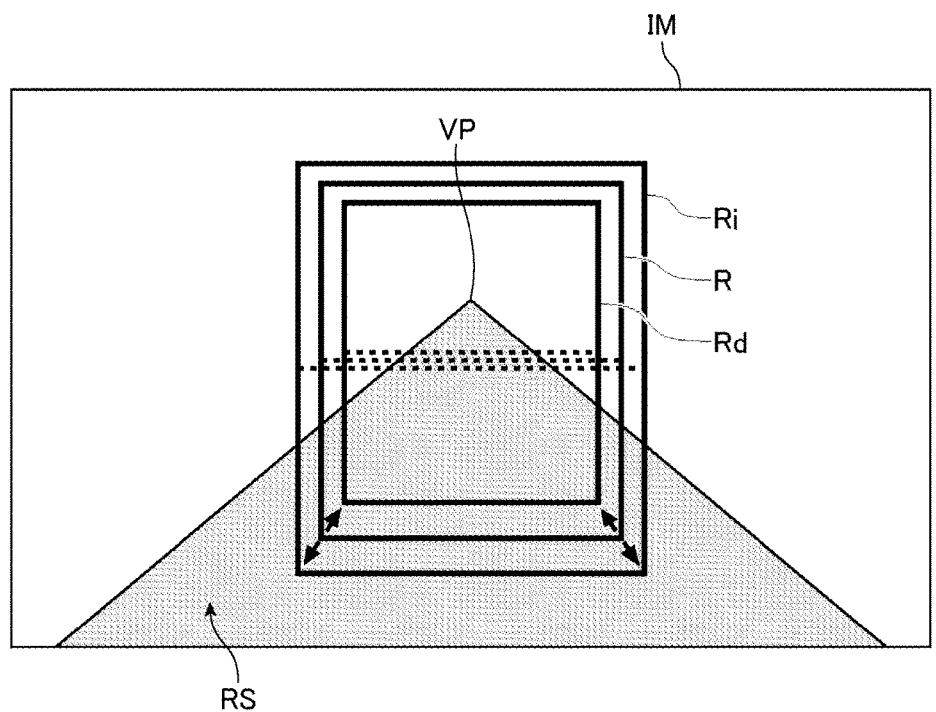
FIG. 8 is a diagram for explaining a mechanism for preventing erroneous detection of a vehicle in a special background.

FIG. 8 is a diagram for describing a mechanism for preventing erroneous detection of a vehicle on a special background. According to the third embodiment, after the variables that minimize the cost are determined, the vehicle presence determining unit 14 generates a region Ri that is the enlarged search region R and a region Rd that is a reduced search region R. Next, the vehicle presence determining unit 14 uses the optical flow model by which the variables that minimize the cost are determined by the cost minimizing unit 13, and calculates the costs of the region Ri and the region Rd.

Figure 9A:
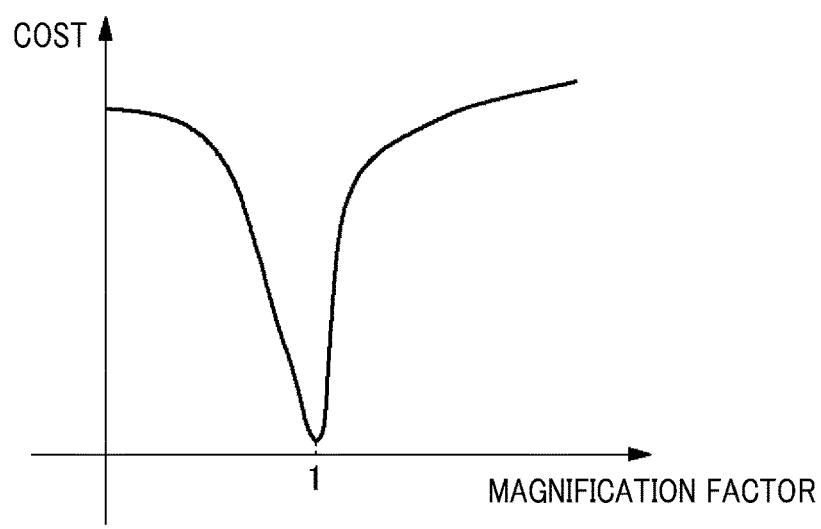
FIGS. 9A and 9B are diagrams of changes in cost when a magnification factor is changed.
Figure 9B:
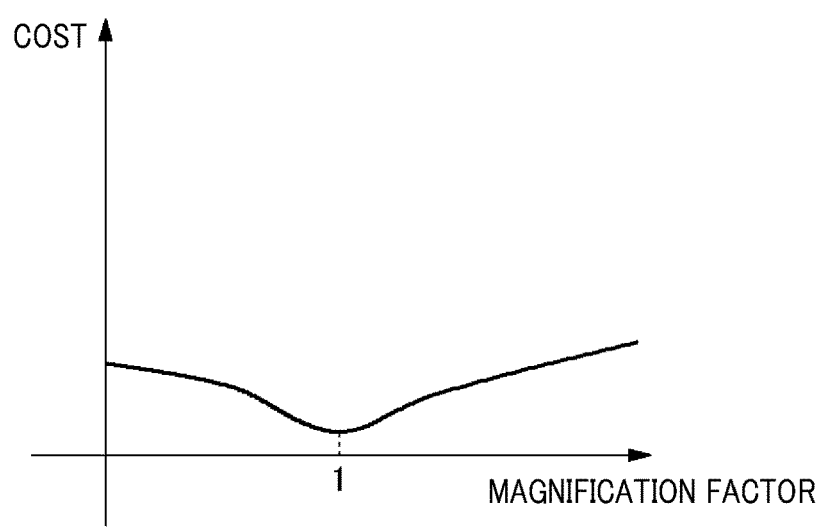

FIGS. 9A and 9B are diagrams of the changes in cost when the magnification factor is changed. When the magnification factor is changed in a case in which a vehicle is present, the cost suddenly increases as shown in FIG. 9A. A reason for this is that the region over which the magnification factor has been changed includes a region to which the optical flow model having the fixed magnification factor does not apply. When a vehicle is erroneously detected to be present as a result of the special background, regardless of a vehicle not being present, even when the magnification factor is changed to and fro, the cost does not significantly change as shown in FIG. 9B. A reason for this is that, even should the magnification factor slightly change, the texture does not change in the periphery of the search region R.

Taking advantage of the properties described above, when the changes in cost when the magnification factor is changed is less than a predetermined threshold, a vehicle is determined not to be present, even should a vehicle be determined to be present based on the distance D between the position of the boundary line B at which the cost is minimized and the horizontal line H. As a result, the accuracy of detection regarding the presence of a vehicle can be further improved.

Here, an example in which the mechanism for preventing erroneous detection is added to the vehicle detection apparatus according to the first embodiment is described. However, this function for preventing erroneous detection can also be applied to the vehicle detection apparatus according to the second embodiment.

(Fourth Embodiment)

Figure 10:
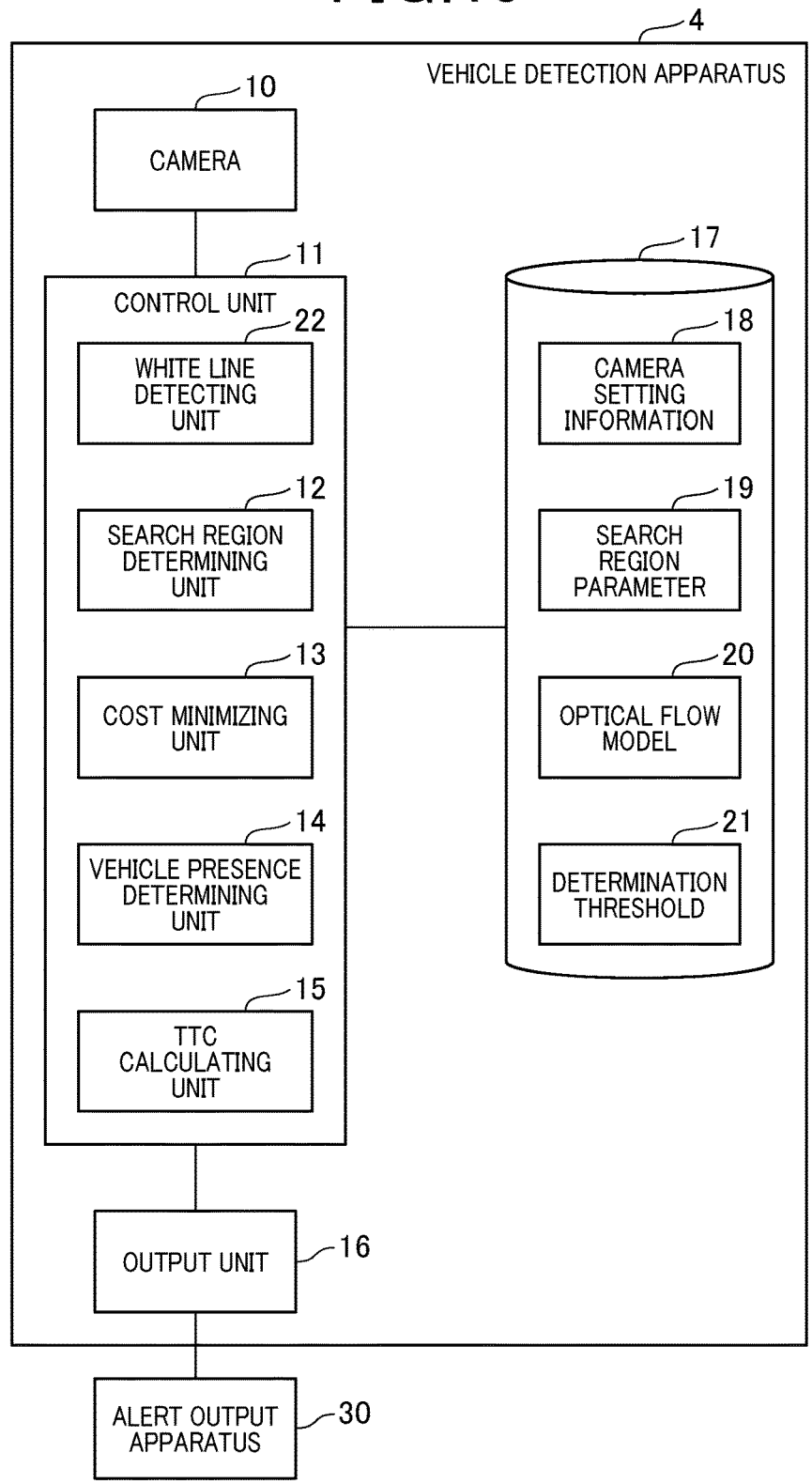
FIG. 10 is a diagram of a configuration of an object detection apparatus according to a fourth embodiment.

FIG. 10 is a diagram of a configuration of a vehicle detection apparatus 4 according to a fourth embodiment. A basic configuration of the vehicle detection apparatus 4 according to the fourth embodiment is identical to that of the vehicle detection apparatus 1 according to the first embodiment. However, the vehicle detection apparatus 4 includes a white line detecting unit 22 that detects, from an image, a white line drawn on a road surface. As techniques for detecting the white line drawn on a road surface, publicly known techniques, such as a method in which edges of a road and a white line are detected, or a template matching method can be used.

Figure 11:
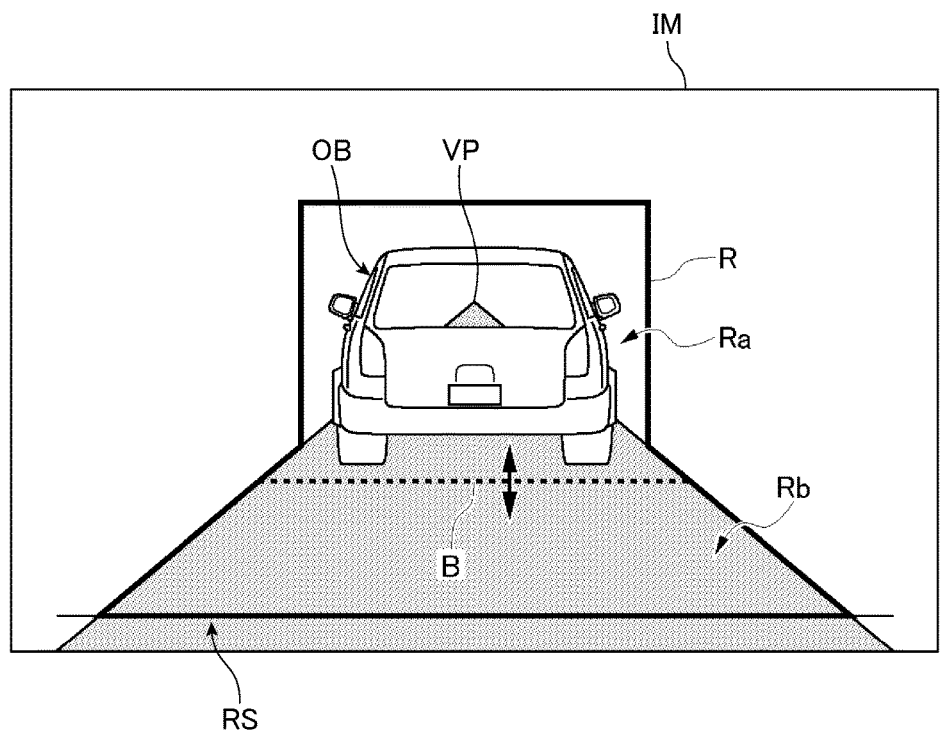
FIG. 11 is a diagram of an example of a search region according to the fourth embodiment.

The vehicle detection apparatus 4 according to the fourth embodiment determines the search region R using information on the white line detected by the white line detecting unit 22. FIG. 11 is an example of the search region R determined by the search region determining unit 12 according to the fourth embodiment. In this way, the search region determining unit 12 determines a region along white lines, particularly regarding the lower region. Consequently, the image outside of the road surface RS is omitted from the calculation process. As a result, images of buildings and roadside trees outside of the road are not included as noise. The accuracy of vehicle detection can be improved.

(Fifth Embodiment)

Figure 12:
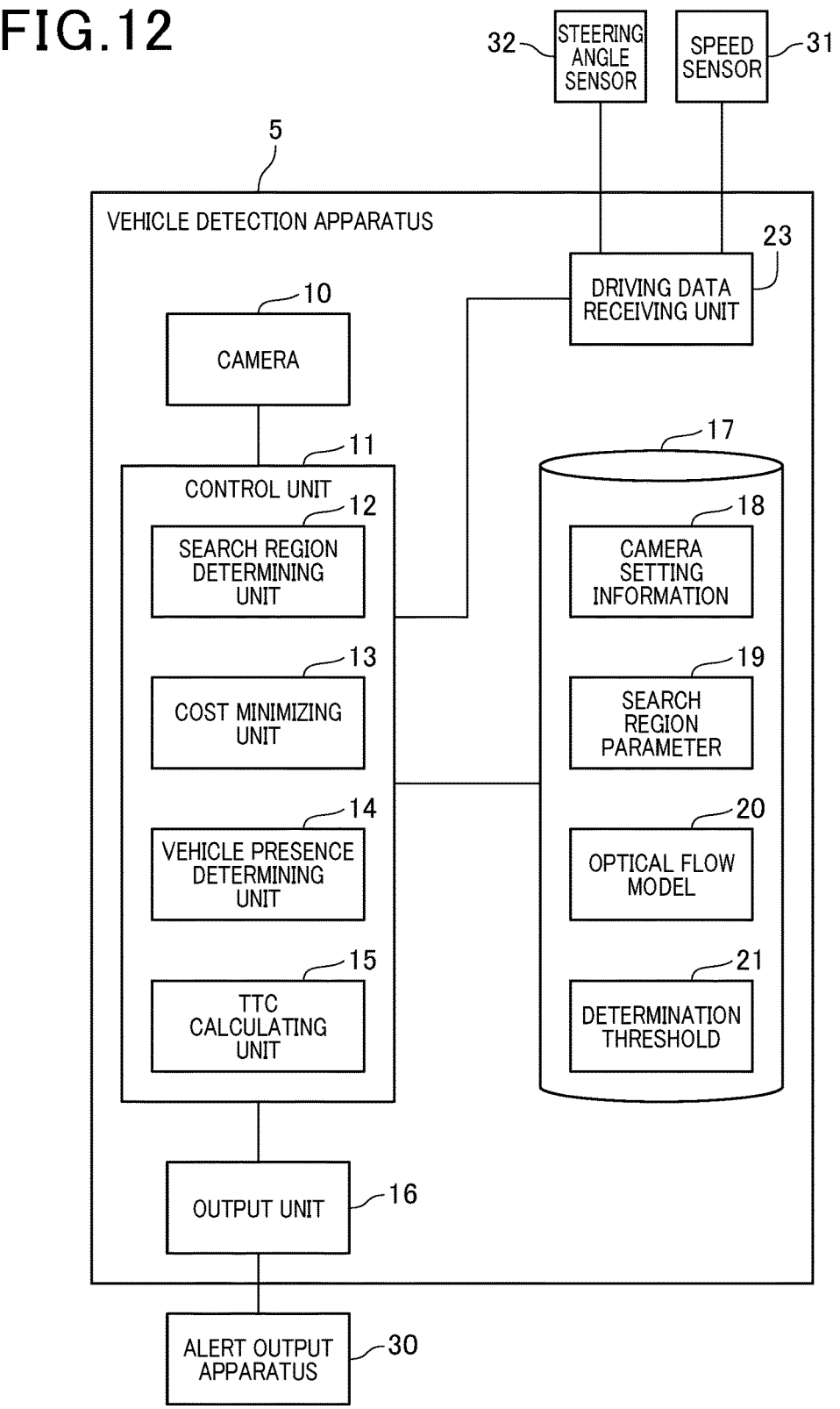
FIG. 12 is a diagram of a configuration of an object detection apparatus according a fifth embodiment.

FIG. 12 is a diagram of a configuration of a vehicle detection apparatus 5 according to a fifth embodiment. The vehicle detection apparatus 5 according to the fifth embodiment includes, in addition to the configuration of the vehicle detection apparatus 1 according to the first embodiment, a driving data receiving unit 23. The driving data receiving unit 23 receives data from a speed sensor 31 that detects a speed of a vehicle and a steering angle sensor 32 that detects a steering angle of a vehicle.

The vehicle detection apparatus 5 according to the fifth embodiment acquires data on speed from the speed sensor 31 and the data on steering angle from the steering angle sensor 32, and performs calculation for cost minimization using the data. That is, because the speed and the rotation angle of the own vehicle are known values, the calculation formula (2) for cost minimization described according to the first embodiment becomes as below. Calculation for cost minimization is facilitated.

$$\arg\min J\{e, d_x, d_y, \text{boundary line position}\} \quad \text{[Formula 20]}$$

According to the present embodiment, an example is described in which driving data is received from both the speed sensor 31 and the steering angle sensor 32. However, the calculation for cost minimization may be performed through reception of driving data from either of the speed sensor 31 and the steering angle sensor 32. In this case as well, the unknown variables can be reduced, and calculation can be simplified.

The object detection apparatus of the present disclosure is described above, with the embodiments of the vehicle detection apparatus given as examples. However, the object detection apparatus of the present disclosure is not limited to the above-described embodiments.

According to the above-described embodiments, an example is given in which the TTC is calculated based on the variable e, which is one of the variables that minimize the cost. However, under an assumption that the boundary line B that minimizes the cost is at the lower end of the forward vehicle, a distance to the forward vehicle may be determined.

According to the above-described embodiments, an example is described in which an object ahead of the own vehicle is detected. However, an object behind the own vehicle may, of course, also be detected.

In addition, a highly accurate object detection can be actualized through combination of the object detection method of the present disclosure and another object detection method based on a different principle.

As described above, the present disclosure is capable of detecting an object from a camera image and is useful as, for example, a vehicle detection apparatus that detects a vehicle traveling ahead of an own vehicle.

In the present disclosure, the control unit 11 (including the search region determining unit 12, the cost minimizing unit 13, the vehicle presence determining unit 14, and the TTC calculating unit 15), the storage unit 17 (including the camera setting information 18, the region determination parameter 19, the optical flow model 20, and the determination threshold), and the output unit 16 may be configured by a computer (e.g., a microcomputer) that includes a processor (e.g., a central processing unit) and a non-transitory computer-readable storage medium (e.g., read-only memory) storing a program enabling the computer to perform the above-mentioned functions of the control unit 11, e.g., expressed by steps S10 to S15 shown in FIG. 5.

One example of the microcomputer may include a central processing unit (CPU), a read-only memory (ROM), a random access memory (RAM), an electrically erasable programmable read-only memory (EEPROM), a digital signal processor (DSP), and the like. The control unit 11 can be realized by a combination of the above hardware elements (CPU, ROM, RAM, EEPROM, DSP, etc.) and one or more software elements (programs) stored in a storage medium (ROM, RAM, EEPROM, etc.). The configurations of the hardware elements and the software elements are not particularly limited, and any configuration may be used as long as the control unit 11 is capable of functioning as each of, or some of, the above units 12 to 15.

For example, a configuration may be such that a single unit (process) is realized by a single program. Alternatively, a configuration may be such that an n number (n being a natural number of 2 or more) of units (processes) is realized by an n–1 or less number of programs (e.g., a single program). The number of hardware elements, such as the CPU, ROM, RAM, EEPROM, and DSP, is also not particularly limited, and may be one, or two or more as long as the control unit 11 is capable of functioning as each of, or some of, the above units 12 to 15.

What is claimed is:

1. An object detection apparatus that detects an object of which a relative distance to a traveling vehicle changes, based on an image captured from the vehicle, the object detection apparatus comprising:
    a camera that is mounted to the vehicle;
    a search region determining unit that determines a region including a road surface in the image to be a search region;
    a cost minimizing unit that divides the search region into two regions, an upper region and a lower region, determines corresponding points in a plurality of images captured by the camera at different time points by applying an optical flow model having a fixed magnification factor to the upper region and an optical flow model having a planar constraint condition to the lower region, and determines a boundary line dividing the upper region and the lower region that minimizes cost related to a difference between pixel values of the corresponding points; and
    a determining unit that determines presence of an object based on the boundary line.

2. The object detection apparatus according to claim 1, wherein:
    the search region is a fixed region within the image; and
    the cost minimizing unit determines the boundary line that minimizes the cost, among boundary lines that are able to divide the search region into the upper region and the lower region.

3. The object detection apparatus according to claim 1, wherein:
    the search region is a variable region that is enlarged or reduced with reference to a vanishing point in the image; and
    the cost minimizing unit determines the search region that minimizes the cost among the variable search regions and determines a boundary line thereof.

4. The object detection apparatus according to claim 3, wherein:
    the boundary line is set such that regions of the upper region and the lower region are equal.

5. The object detection apparatus according to claim 4, comprising:
    a white line detecting unit that detects a white line on a road from the image, wherein
    the search region determining unit determines the search region based on the white line detected by the white line detecting unit.

6. The object detection apparatus according to claim 5, wherein:
    the search region determining unit determines a search region having a shape that matches the road surface.

7. The object detection apparatus according to claim 6, comprising:
    a driving data receiving unit that receives data on speed or rotation angular velocity of the vehicle acquired from a sensor in the vehicle, wherein
    the cost minimizing unit performs cost minimization calculation using the data on speed or rotation angular velocity of the vehicle.

8. The object detection apparatus according to claim 7, comprising:
    a time-to-collision calculating unit that determines an amount of time until a detected object collides with the vehicle, based on a value determined by the cost minimizing unit.

9. The object detection apparatus according to claim 8, comprising:
    a distance calculating unit that determines a distance to an object, with the boundary line determined by the cost minimizing unit set to a lower end portion of the object.

10. The object detection apparatus according to claim 9, wherein:
    the determining unit determines a change in cost when the upper region and the lower region that minimize cost, determined by the cost minimizing unit, are enlarged or reduced with reference to the vanishing point in the image, and determines that an object is not present when the change in cost is within a predetermined threshold.

11. The object detection apparatus according to claim 1, comprising:
    a white line detecting unit that detects a white line on a road from the image, wherein
    the search region determining unit determines the search region based on the white line detected by the white line detecting unit.

12. The object detection apparatus according to claim 1, comprising:
    a driving data receiving unit that receives data on speed or rotation angular velocity of the vehicle acquired from a sensor in the vehicle, wherein
    the cost minimizing unit performs cost minimization calculation using the data on speed or rotation angular velocity of the vehicle.

13. The object detection apparatus according to claim 1, comprising:
   a time-to-collision calculating unit that determines an amount of time until a detected object collides with the vehicle, based on a value determined by the cost minimizing unit.

14. The object detection apparatus according to claim 1, comprising:
   a distance calculating unit that determines a distance to an object, with the boundary line determined by the cost minimizing unit set to a lower end portion of the object.

15. The object detection apparatus according to claim 1, wherein:
   the determining unit determines a change in cost when the upper region and the lower region that minimize cost, determined by the cost minimizing unit, are enlarged or reduced with reference to the vanishing point in the image, and determines that an object is not present when the change in cost is within a predetermined threshold.

16. A method for detecting, by an object detection apparatus, an object of which a relative distance to a traveling vehicle changes based on an image captured from the vehicle, the method comprising:
   a step of capturing an image of a region ahead of or behind the vehicle by a camera mounted to the vehicle;
   a step of determining, by the object detection apparatus, a region including a road surface in the image to be a search region;
   a step of dividing, by the object detection apparatus, the search region into two regions, an upper region and a lower region, determining corresponding points in a plurality of images captured by the camera at different time points by applying an optical flow model having a fixed magnification factor to the upper region and an optical flow model having a planar constraint condition to the lower region, and determining a boundary line dividing the upper region and the lower region that minimizes cost related to a difference between pixel values of the corresponding points; and
   a step of determining, by the object detection apparatus, presence of an object based on the boundary line.

17. A non-transitory computer-readable storage medium storing a program for detecting an object of which a relative distance to a traveling vehicle changes based on an image captured from the vehicle, the program enabling a computer to perform:
   a step of acquiring an image captured by a camera mounted to the vehicle;
   a step of determining a region including a road surface in the image to be a search region;
   a step of dividing the search region into two regions, an upper region and a lower region, determining corresponding points in a plurality of images captured by the camera at different time points by applying an optical flow model having a fixed magnification factor to the upper region and an optical flow model having a planar constraint condition to the lower region, and determining a boundary line dividing the upper region and the lower region that minimizes cost related to a difference between pixel values of the corresponding points; and
   a step of determining presence of an object based on the boundary line.

* * * * *